United States Patent [19]

Stein et al.

[11] 4,436,859

[45] Mar. 13, 1984

[54] POLYNORBORNENES CURED WITH ISOCYANATES AND OPTIONALLY WITH POLYOLS

[75] Inventors: Claude Stein, Gouvieux; André Marbach, Verneuil, both of France

[73] Assignee: Société Chimique Des Charbonnages S.A., Paris, France

[21] Appl. No.: 291,150

[22] Filed: Aug. 7, 1981

[30] Foreign Application Priority Data

Aug. 8, 1980 [FR] France ............................... 80 17514

[51] Int. Cl.³ .......................... C08K 5/12; C08K 5/01; C08K 5/11; C08F 8/30
[52] U.S. Cl. .................................... 524/297; 524/314; 524/553; 525/123; 525/127; 525/131; 525/54.26
[58] Field of Search ...................... 525/123, 127, 131; 524/297, 314, 553

[56] References Cited

U.S. PATENT DOCUMENTS 3,277,036 10/1966 Whitworth et al. ............... 525/123
3,336,275 8/1967 Michelohi .
3,367,924 2/1968 Rinehart .
3,557,072 1/1971 Vergne et al. .
3,676,390 7/1972 Vergne et al. .
3,752,699 8/1973 Harrell et al. ..................... 525/123
4,020,021 4/1977 Lahouste et al. .................... 521/80
4,045,462 8/1977 Bock et al. ........................ 525/123
4,137,210 1/1979 Stein et al. ..................... 260/31.2 R

FOREIGN PATENT DOCUMENTS 2302312 of 0000 France .
1535460 of 0000 France .
1536305 of 0000 France .
94571 of 0000 France .

Primary Examiner—John C. Bleutge
Assistant Examiner—Robert Sellers
Attorney, Agent, or Firm—Millen & White

[57] ABSTRACT

Polynorbornenes are cured with isocyanates optionally in the presence of polyols to yield elastomeric products having improved mechanical properties, particularly improved compression moduli and residual set while retaining the desired rebound elasticity values.

19 Claims, No Drawings

POLYNORBORNENES CURED WITH ISOCYANATES AND OPTIONALLY WITH POLYOLS

BACKGROUND OF THE INVENTION

It is known that the ring-opened polymers of bicyclo 2,2-1-heptene-2, generally called ring-opened polynorbornenes (hereinafter polynorbornenes) and obtained by ring-opening polymerization of norbornene or its substituted derivatives, exhibit excellent compatibility with ester-type plasticizers such as dioctyl phthalate, dioctyl sebacate or butyl adipate and more particularly with the petroleum based or synthetic plasticizers of an aromatic, naphthenic and paraffinic nature. The preparation and properties of polynorbornene and its derivatives are for example described in French Pat. No. 1,535,460 of Jan. 12, 1967, corresponding to U.S. Pat. No. 3,557,072, and in French Pat. No. 1,536,305 of June 27, 1967, corresponding to U.S. Pat. No. 3,676,390, and its patent of addition French No. 94,571 of May 16, 1968, all of said patents as well as the French patent applications recited infra being incorporated by reference herein.

The rate of absorption of these plasticizers is particularly high with polynorbornenes in the form of a finely divided powder as obtained according to the process described in French Patent Application No. 74.10368 of Mar. 26, 1974, corresponding to U.S. Pat. No. 4,020,021. These finely divided polynorbornenes having a particle size of 0.01 to 2 mm, preferably of 0.01 to 0.8 mm, are able to absorb more than 7 times their weight of plasticizer of the aromatic or naphthenic type using simple mixing at ambient temperature.

It is generally known from French Patent Application No. 75.06213 of Feb. 27, 1975, corresponding to U.S. Pat. No. 4,137,210, that an appropriate choice of the amount and type of plasticizer makes it possible to obtain mixtures of polynorbornene and a plasticizer which maintain, after the constituents have been kept in contact for a sufficient period of time, a degree of fluidity which permits them to be simply poured, at ambient temperature, into molds, dies or other shaping means. Gelling them follows spontaneously and progressively at 1 to 24 hours after pouring. The finished article can then be removed from the mold or withdrawn from its shaping means. (See col. 1, line 46-col. 2, line 28, and col. 2, lines 34-49, of U.S. Pat. No. 4,137,210.) By way of example, one could mix, at ambient temperature, 100 parts by weight of polynorbornene having a particle size from 0.01 to 0.5 mm sold under the Trademark NORSOREX F by CdF-Chimie with 300 parts by weight of a petroleum-based or synthetic naphthenic plasticizer of medium or low density such as the oil sold under the Trademark SOMIL-B by Shell France, under the Trademark PIONIER SRW-8 by Hansen and Rosenthal, under the Trademark ENERTHENE 43 by British Petroleum and under the Trademark SUNTHENE 255 by Sunoil Co. The mixture obtained is ready for pouring into a mold 2 to 6 minutes after the constituents have been brought into contact and is completely gelled after 1 to 48 hours at ambient temperature.

The resultant gelled masses present numerous advantages. In particular, the rebound resilience can easily be varied over a fairly wide range. In practice, this varies as a function of the type and amount of plasticizer employed. Nevertheless, as these masses are not cross-linked, the residual set (permanent deformation) under mechanical stress, in particular under compression, is often too high. The residual set characteristics have already been improved by incorporating additives in the mixture, as described in French Patent Application No. 75.06213 of Feb. 27, 1975, of fillers and cross-linking agents such as sulphur, sulphur donors or peroxides so as to provide, within the body of the material, a three-dimensional cross-linked network. (See col. 2, line 50-col. 3, line 4, and the examples at col. 3, line 12-col. 4, line 21, of U.S. Pat. No. 4,137,210.) The fillers and cross-linking agents are generally incorporated by dispersing them into the plasticizer at a rate of 1 to 10 parts by weight to 100 parts of polynorbornene before adding the plasticizer to the polynorbornene.

SUMMARY OF THE INVENTION

An object of this invention is to provide a process for preparing elastomer materials based on polynorbornene in which the residual set characteristics are further improved when compared to the use of the polynorbornene cross-linking agents of the prior art while retaining the regulability of the rebound resilience.

Another object is to provide novel polynorbornene-curing agent mixtures and the cured products produced thereby.

Another object is to provide novel cured polynorbornenes having improved moduli of compression.

Upon further study of the specification and appended claims, further objects and advantages of this invention will become apparent to those skilled in the art.

To attain these objects, there is employed as a curing or cross-linking agent, at least one isocyanate, preferably in association with a polyol. Whereas it has been ascertained that an improvement is brought about in the residual set characteristics under mechanical stress of the polynorbornene-based elastomer material using the addition of isocyanates alone, this improvement is even further enhanced to an appreciable degree if a polyol is associated with the isocyanate.

The isocyanates are preferably those which are used for the manufacture of polyurethane. Exemplified isocyanates include but are not limited to 4,4'-diphenylmethane diisocyanate (MDI), methyl diisocyanate, the toluene diisocyanates (TDI), m-xylene diisocyanate and dianisidine diisocyanate and mixtures of these isocyanates, in particular mixtures of TDI and MDI.

The amount of isocyanate added varies from 15 to 750 parts by weight to 100 parts of polynorbornene and is preferably of from 20 to 500 parts by weight. When an amount of isocyanate less than 15 parts is employed, the effect of the addition of the isocyanate is not appreciable.

The polyols associated with the isocyanate are also those generally used in the manufacture of polyurethane, in particular polyether polyols and/or natural or synthetic polyols. Examples of polyols include but are not limited to glycols, glycerols, sucrose, and starch. Examples of polyether polyols include but are not limited to reaction products of propylene oxide with glycol, glycerol, trimethylol propane, 1,2,6-hexane triol, pentaerythritol or sorbitol or the reaction products of oxypropylene-b-oxyethylene with glycol, trimethylol propane or ethylene diamine.

The polyols are added in an amount of from 10 to 1500 parts, and preferably in an amount of 50 to 750 parts by weight to 100 parts by weight of polynorbornene.

As the presence of the isocyanate alone improves the residual set characteristics under mechanical stress of the elastomer mass, it appears that cross-linking or curing does exist although the reaction mechanism is not known. The association of an isocyanate with a polyol is a technique which is well known in the manufacture of polyurethane. Under these conditions, it appears that there is both cross-linking of the polynorbornene and the formation of polyurethane.

As for the type of polynorbornene, any polymer can be used based on nonbornene or a derivative thereof, including but not limited to those described in the patents and patent applications incorporated by reference herein.

The ingredients employed in the examples and the process employed therein (except for test 1), constitutes the best mode of conducting the invention.

If desired, it is also possible to incorporate into the mixture conventional substances such as cross-linking activators, degassing agents, protective agents, fire retardants, swelling agents or even colorants. It is also possible to add fillers such as chalk, kaolin, baryta, magnetic powders or abrasive powders.

To produce the cured polynorbornenes, the isocyanate, any polyol, any activators, any degassing agents, any colorants and any fillers or other additives are introduced into the plasticizer. It is likewise possible to add the plasticizer to the isocyanate and any polyol associated therewith. While mixing the aforesaid ingredients, the polynorbornene is then introduced. The entire operation is generally carried out at room temperature.

The resultant gel is poured into a mold or a device to prevent deformation during cooling of the molded article, this still being done at ambient temperature. The setting of the mixture generally takes place after a period of 15 minutes to 3 hours at 20°-25° C., and the cross-linking is complete after 24 hours to 72 hours. The removal of the articles from the mold is generally possible after 2 to 24 hours. If it is desired to accelerate the gelling process and the cross-linking process, this can be done by heating the mixture after it has been poured, for example at a temperature of 50° to 100° C. for a period of time of from 5 minutes to 1 hour.

The resultant product can be used as a floor covering for industrial use or for homes, as a surface for sporting areas, as a sealing component in buildings, civil engineering or marine engineering, for the filling of tires, for the manufacture of structures and articles of comfort and of safety, for use in electrical and thermal insulation, for the manufacture of flexible dies and molds or for abrasive wheels or blocks.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

TESTS 1–10

Except for comparison test 1, the cross-linking agents are those of the invention, as seen in the following Table.

In test 1, a plasticizer and cross-linked polynorbornene was prepared with the aid of the cross-linking agent having the following composition:

| | |
|---|---|
| ZnO | 5 parts |
| Sulphur | 2 parts |
| Zn ethylxanthate | 1 part |
| Dithicarbamate (sold under the Trademark BUTYL EIGHT by Uniroyal) | 2 parts |

In tests 3, 6, 8 and 9, a polyurethane was prepared using the action of an isocyanate on a polyalcohol in the presence of an activator which was butyl amine.

In all the tests, the polynorbornene used was that sold under the Trademark NORSOREX F by CdF-Chimie. It was described in precited French Pat. No. 1,535,460, 1,536,305, and its addition 94571. These patents describe elastomeric polymers of the series of bicyclo [2.2.1] heptene-2 and/or methyl-5 bicyclo [2,2,1] heptene 2 and substitution derivative compounds.

The plasticizer was that sold under the Trademark PIONIER SRW8 by Hansen nd Rosenthal: it is an alkyl-benzene plasticizer having naphtenic characteristic.

The isocyanate was a product based on modified MDI sold under the Trademark RHENODUR C110 by Rheinchemie.

The polyol was a mixture of polyether and of glycol sold under the Trademark RHENOPHENE E123 by Rheinchemie.

In all the tests, the gel was prepared by mixing the isocyanate, the polyol and optionally the activator with the plasticizer, followed by addition of the polynorbornene to the product obtained.

The following measurements were carried out.

Casting time in minutes: time after which it is visually observed that the mixture can no longer be poured.

Gelling time: a time which is visually estimated and at the end of which the mixture no longer presents any liquid phase.

Shore A hardness according to ASTM D 676.

Rebound resilience according to DIN 53-512.

The compression moduli measured using an INSTRON machine at a rate of compression of 1 cm/mn on blocks of 27 mm diameter and 13.5 mm thickness.

The results are given in the table below in which the amounts given are per 100 parts of NORSOREX except in test 3 where no NORSOREX was used.

TABLE

| Test No. | Plasti- cizer | Isocya- nate | Polyol | Acti- vator | Casting (min.) | Gelling (min.) | Measure- ment (days) | Shore hard- ness A | Rebound resil- ience % | Compression modulus kg/cm² | | |
|---|---|---|---|---|---|---|---|---|---|---|---|---|
| | | | | | | | | | | 20 | 30 | 40 |
| 1 | 300 | — | — | — | 3 | 5 | 3 | 10 | 68 | 1.0 | 2.0 | 3.8 |
| | | | | | | | 15 | | | 1.1 | 2.4 | 4.5 |
| 2 | 300 | — | — | — | 2 | 4 | 3 | 12 | 70 | 1.2 | 2.4 | 4.3 |

TABLE-continued

| Test No. | Plasti-cizer | Isocya-nate | Polyol | Acti-vator | TIME OF Casting (min.) | TIME OF Gelling (min.) | Measure-ment (days) | Shore hard-ness A | Rebound resil-ience % | Compression modulus kg/cm² 20 | Compression modulus kg/cm² 30 | Compression modulus kg/cm² 40 |
|---|---|---|---|---|---|---|---|---|---|---|---|---|
| 3 | — | 25 | 100 | 1.3 | 3 | 10 | 15 / 3 / 15 | 28 | 30 | 1.6 / 2.5 / 2.5 | 2.9 / 4.3 / 4.4 | 4.8 / 7.9 / 7.7 |
| 4 | 300 | 50 | — | — | 3 | 6 | 3 / 15 | 12 / 20 | 70 / 58 | 1.2 / 1.6 | 2.0 / 2.9 | 3.8 / 5.9 |
| 5 | 300 | 25 | 100 | — | 5 | 10 | 15 | 20 | 50 | 1.4 | 3.1 | 6.2 |
| 6 | 300 | 25 | 100 | 1 | 5 | 10 | 3 | 18 | 55 | 1.3 | 2.7 | 5.5 |
| 7 | 300 | 50 | 100 | — | 4 | 15 | 3 | 22 | 52 | 2.0 | 3.9 | 7.6 |
| 8 | 300 | 50 | 100 | 1 | 3 | 5 | 2 / 15 | 25 | 55 | 2.8 / 2.9 | 4.9 / 5.2 | 8.2 / 9.1 |
| 9 | 300 | 50 | 100 | 2 | 3 | 5 | 2 / 15 | 25 | 57 | 2.2 / 2.7 | 4.0 / 5.2 | 6.8 / 9.1 |
| 10 | 450 | 50 | 100 | — | 10 | 25 | 3 / 15 | 12 | 48 | 1.3 / 1.5 | 2.4 / 2.7 | 4.7 / 5.1 |

TEST 11

A process according to the above tests was followed by mixing, per 100 parts of NORSOREX F and 300 parts of PIONIER SRW 8, 500 parts of RHENODUR 110 as the isocyanate and 1000 parts of RHENOPHENE E123 as the polyol. In one of the tests, 20 parts of butyl amine was added as the activator, and in the other, 10 parts. The resultant mixtures were spongy masses which presented a certain rigidity to the hand.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for preparing a ring-opened polynorbornene composition which is castable at ambient temperature, comprising the step of admixing, at ambient temperature, a finely divided ring-opened polynorbornene prepared by ring-opening catalytic polymerization, with an effective fluidifying amount of an ester or hydrocarbon plasticizer and an effective amount for curing of a curing agent, thereby forming a castable fluid mixture, the improvement wherein said curing agent is an isocyanate cross-linking agent; whereby the resultant mixture is castable and curable at ambient temperature and the resultant cured elastomeric product has an improved compression modulus and residual set while retaining its desired rebound elasticity values.

2. A process according to claim 1, wherein said curing agent further comprises a polyol.

3. A process according to claim 1 wherein the amount of isocyanate is 15–750 parts by weight per 100 parts by weight of ring-opened polynorbornene.

4. A process according to claim 1 wherein the amount of isocyanate is 20–500 parts by weight per 100 parts by weight of ring-opened polynorbornene.

5. A process according to claim 2, wherein the amount of polyol is 10–1500 parts by weight and the amount of isocyanate is 15–750 parts by weight per 100 parts by weight of ring-opened polynorbornene.

6. A process according to claim 2, wherein the amount of polyol is 50–750 parts by weight and the amount of isocyanate is 20–500 parts by weight per 100 parts by weight of ring-opened polynorbornene.

7. A process according to claim 5, wherein said curing agent further comprises a butylamine activator.

8. A process according to any of claims 1–7, which further comprises the steps of casting said resultant castable fluid mixture, gelling the cast mixture, curing the gelled mixture and recovering the resultant elastomeric product.

9. The elastomeric product produced by a process according to claim 8.

10. An ambient temperature cast and cured elastomer having improved residual set characteristics, comprising ring-opened polynorbornene, an effective ambient temperature fluidifying amount of an ester or hydrocarbon plasticizer, and cross-linked by an effective amount for ambient temperature cross-linking of an isocyanate curing agent.

11. An elastomer according to claim 10, wherein the amount of isocyanate is 15–750 parts by weight per 100 parts by weight of ring-opened polynorbornene.

12. An elastomer according to claim 11, wherein the amount of isocyanate is 20–500 parts by weight per 100 parts by weight of ring-opened polynorbornene.

13. An elastomer according to claim 10, wherein said isocyanate curing agent further comprises a polyol.

14. An elastomer according to claim 13, wherein the amount of polyol is 10–1500 parts by weight and the amount of isocyanate is 15–750 parts by weight per 100 parts by weight of ring-opened polynorbornene.

15. An elastomer according to claim 14, wherein the amount of polyol is 50–750 parts by weight and the amount of isocyanate is 20–500 parts by weight per 100 parts by weight of ring-opened polynorbornene.

16. An elastomer according to claim 10, wherein said isocyanate is 4,4′-diphenylmethane diisocyanate, methyl diisocyanate toluene diisocyanate, m-xylene diisocyanate, dianisidine diisocyanate or a mixture thereof.

17. An elastomer according to claim 13, wherein said polyol is glycol, glycerol, glucose, starch, or a polyether polyol which is a reaction product of propylene oxide with glycol, glycerol, trimethylol propane, 1,2,6-hexanetriol, pentaerythritol or sorbitol, or a reaction product of oxypropylene-b-oxyethylene with glycol, trimethylol propane or ethylene diamine.

18. A process according to claim 1, wherein said isocyanate is 4,4-diphenylmethane diisocyanate, methyl diisocyanate, toluene diisocyanate, M-xylene diisocyanate, dianisidine diisocyanate or a mixture thereof.

19. A process according to claim 2, wherein said polyol is glycol, glycerol, glucose, starch, or a polyether polyol which is a reaction product of propylene oxide with glycol, glycerol, trimethylol propane, 1,2,6-hexanetriol, pentaerythritol or sorbitol, or a reaction product of oxypropylene-b-oxyethylene with glycol, trimethylol propane or ethylene diamine.

* * * * *